(12) United States Patent
Thompson et al.

(10) Patent No.: US 9,571,647 B2
(45) Date of Patent: Feb. 14, 2017

(54) EMERGENCY COMMUNICATION SOLUTION

(71) Applicant: PioneerNet Solutions Inc., Ottawa (CA)

(72) Inventors: Gregg Thompson, Ottawa (CA); Rex Benning, Santa Clara, CA (US)

(73) Assignee: PioneerNet Solutions Inc., Ottawa (CA)

( * ) Notice: Subject to any disclaimer, the term of this patent is extended or adjusted under 35 U.S.C. 154(b) by 263 days.

(21) Appl. No.: 14/300,578

(22) Filed: Jun. 10, 2014

(65) Prior Publication Data
US 2014/0362708 A1    Dec. 11, 2014

Related U.S. Application Data

(60) Provisional application No. 61/833,283, filed on Jun. 10, 2013.

(51) Int. Cl.
| | |
|---|---|
| *H04L 12/66* | (2006.01) |
| *H04M 3/51* | (2006.01) |
| *H04M 3/22* | (2006.01) |
| *H04L 12/26* | (2006.01) |
| *H04M 3/42* | (2006.01) |

(52) U.S. Cl.
CPC ............ *H04M 3/5116* (2013.01); *H04L 43/10* (2013.01); *H04M 3/2281* (2013.01); *H04M 3/42357* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,069,890 A | * | 5/2000 | White | H04M 3/4228 370/352 |
| 6,542,500 B1 | * | 4/2003 | Gerszberg | G06Q 50/188 370/354 |
| 7,428,002 B2 | | 9/2008 | Monroe | |
| 7,593,512 B2 | * | 9/2009 | Elliot | G08B 25/08 340/508 |
| 8,059,631 B2 | * | 11/2011 | Anto Emmanuel | H04M 3/5116 370/338 |
| 8,184,785 B2 | * | 5/2012 | Kuroda | B66B 3/00 379/106.01 |
| 2004/0086093 A1 | | 5/2004 | Schranz | |
| 2008/0205600 A1 | | 8/2008 | Sparks | |

OTHER PUBLICATIONS

Office Action in Canadian patent application No. 2,853,952 dated Nov. 9, 2015. (4 pages).

\* cited by examiner

*Primary Examiner* — Frank Duong
(74) *Attorney, Agent, or Firm* — NIXON PEABODY LLP

(57) ABSTRACT

A communication system for emergency communication comprises a communication server to establish an IP based voice communication between an endpoint and a monitoring center. In one implementation, the system establishes an emergency call using an emergency communication system comprising a communication endpoint, a communication interface and a monitoring center comprising an automation system and a communication server to establish an IP based voice communication. The system initiates the emergency call at the endpoint location using the communication interface, establishes an IP based voice communication between the endpoint and the monitoring center via the communication server, and automatically sends a message from the communication server to the automation system when the call is initiated.

14 Claims, 7 Drawing Sheets

Emergency Communication Solution

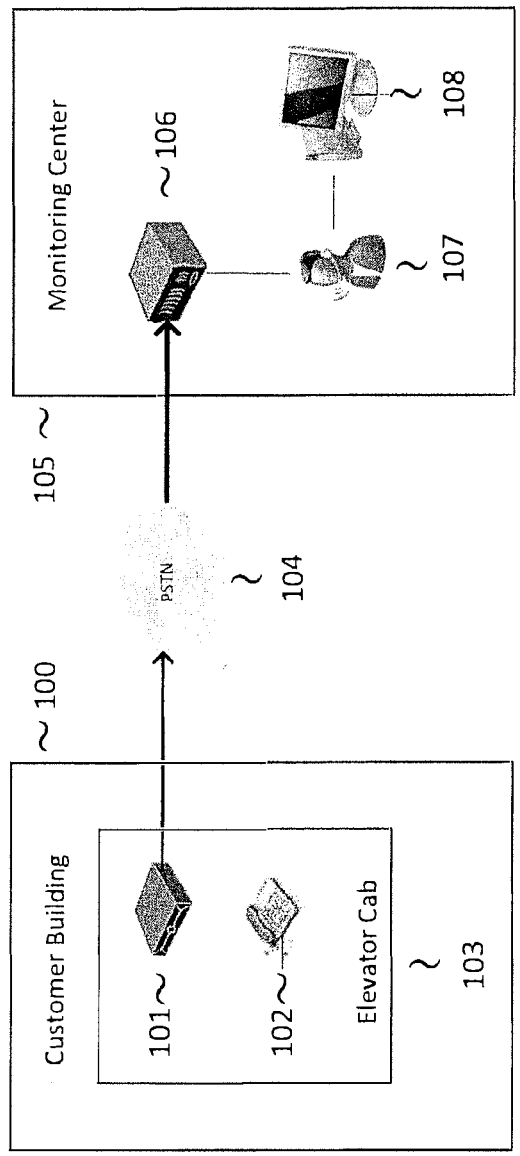
Emergency Communication Solution - Figure 1
PRIOR ART

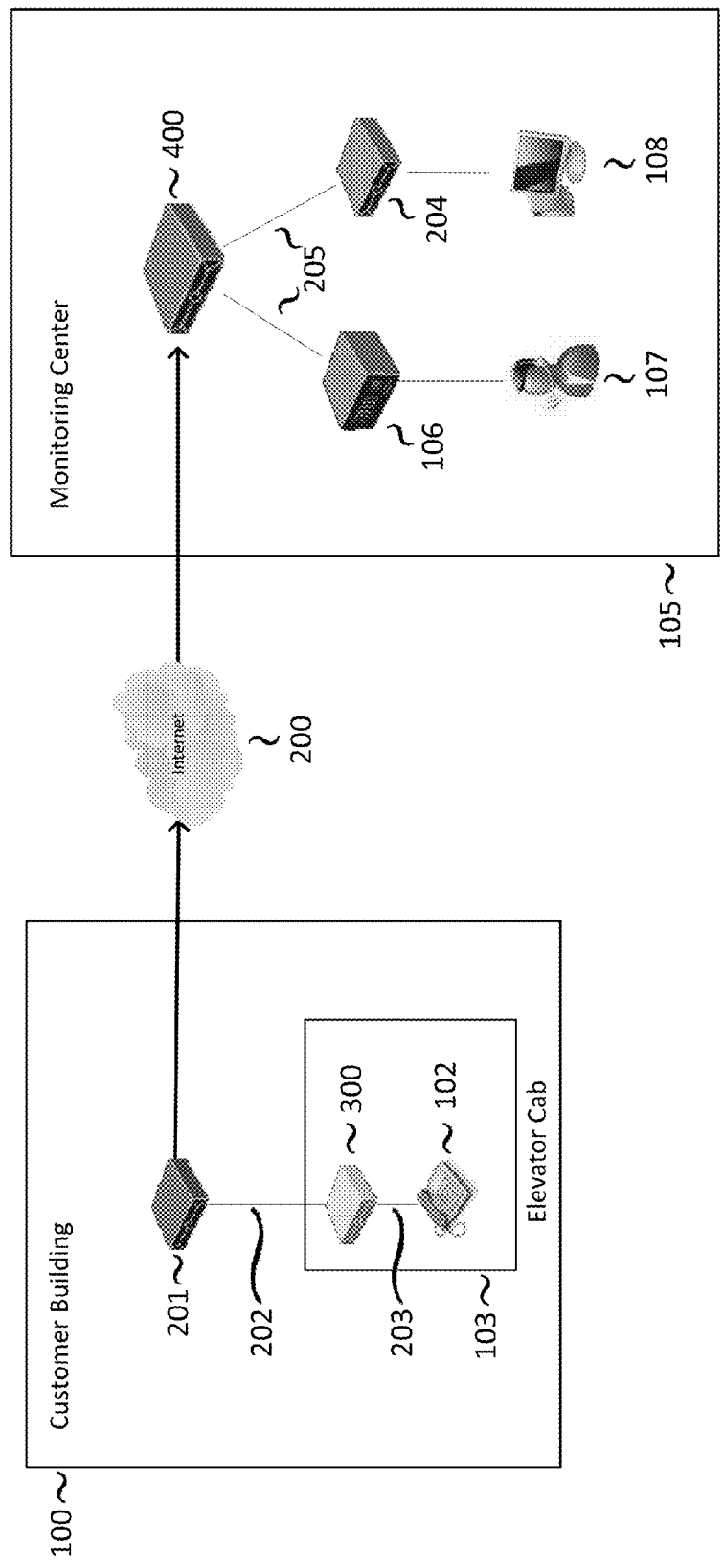
Emergency Communication Solution - Figure 2

Emergency Communication Solution - Figure 3
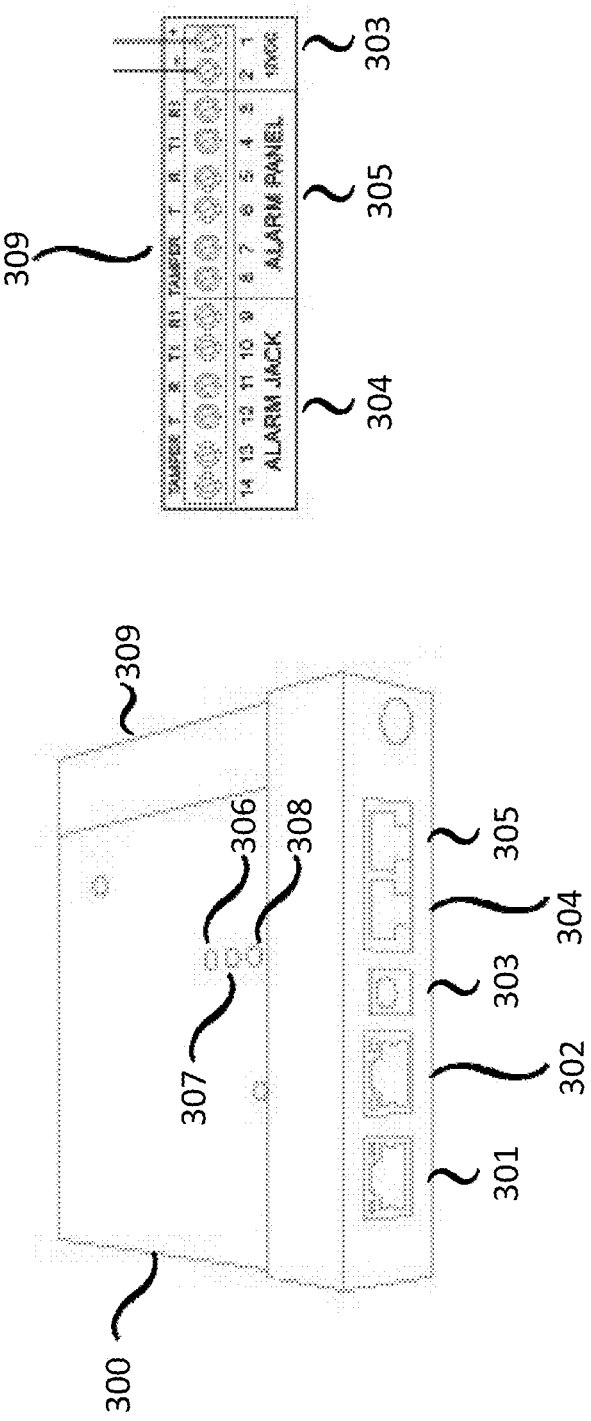

Emergency Communication Solution - Figure 4
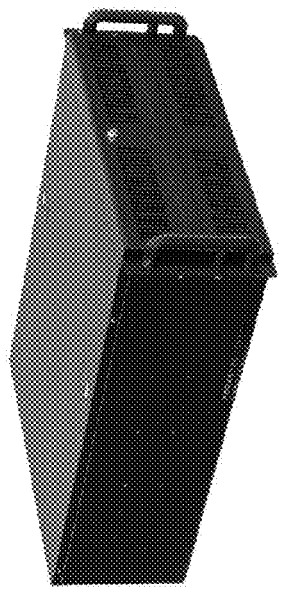
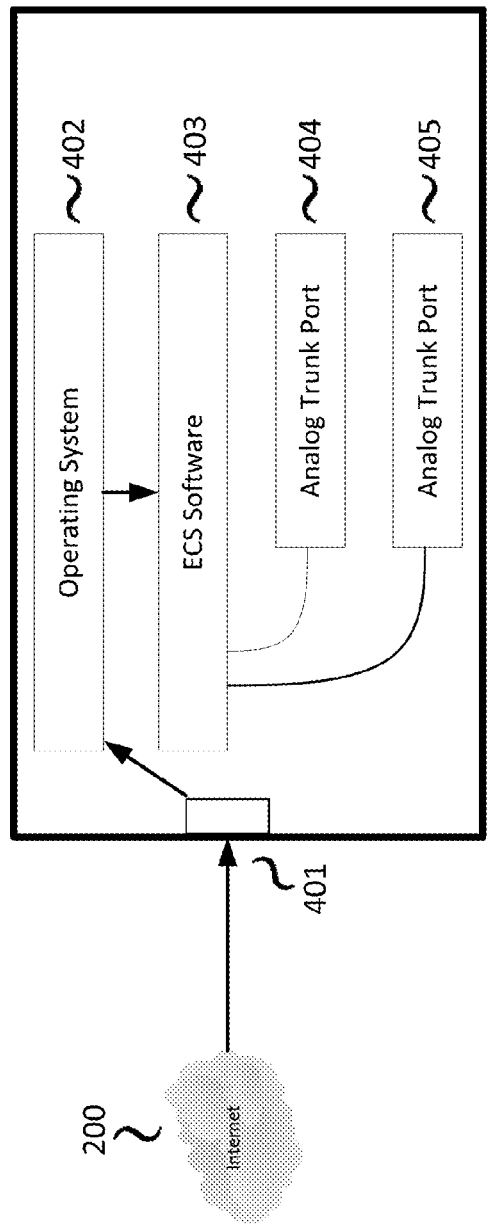

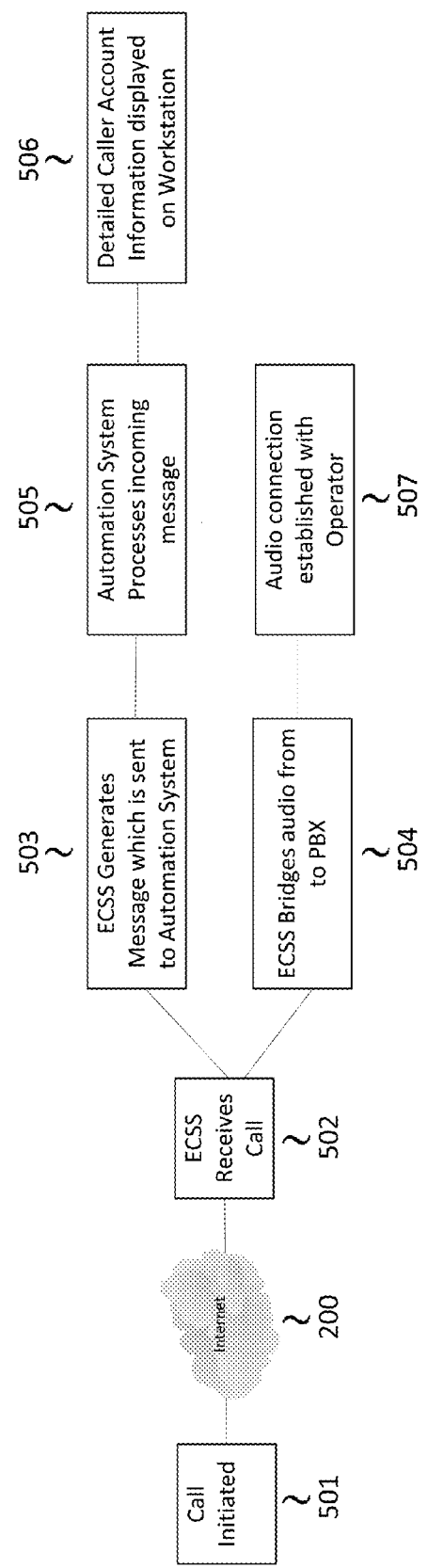
Emergency Communication Solution - Figure 5

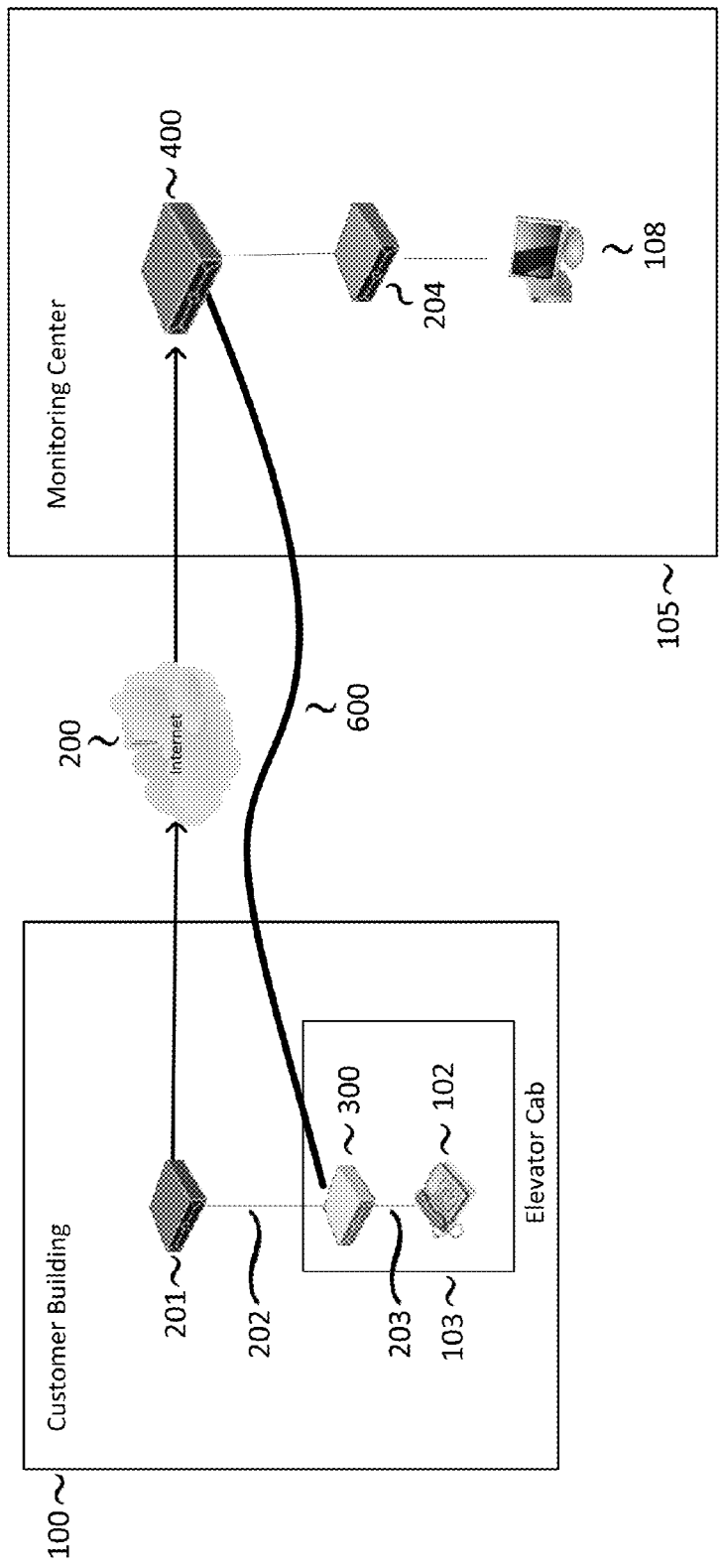

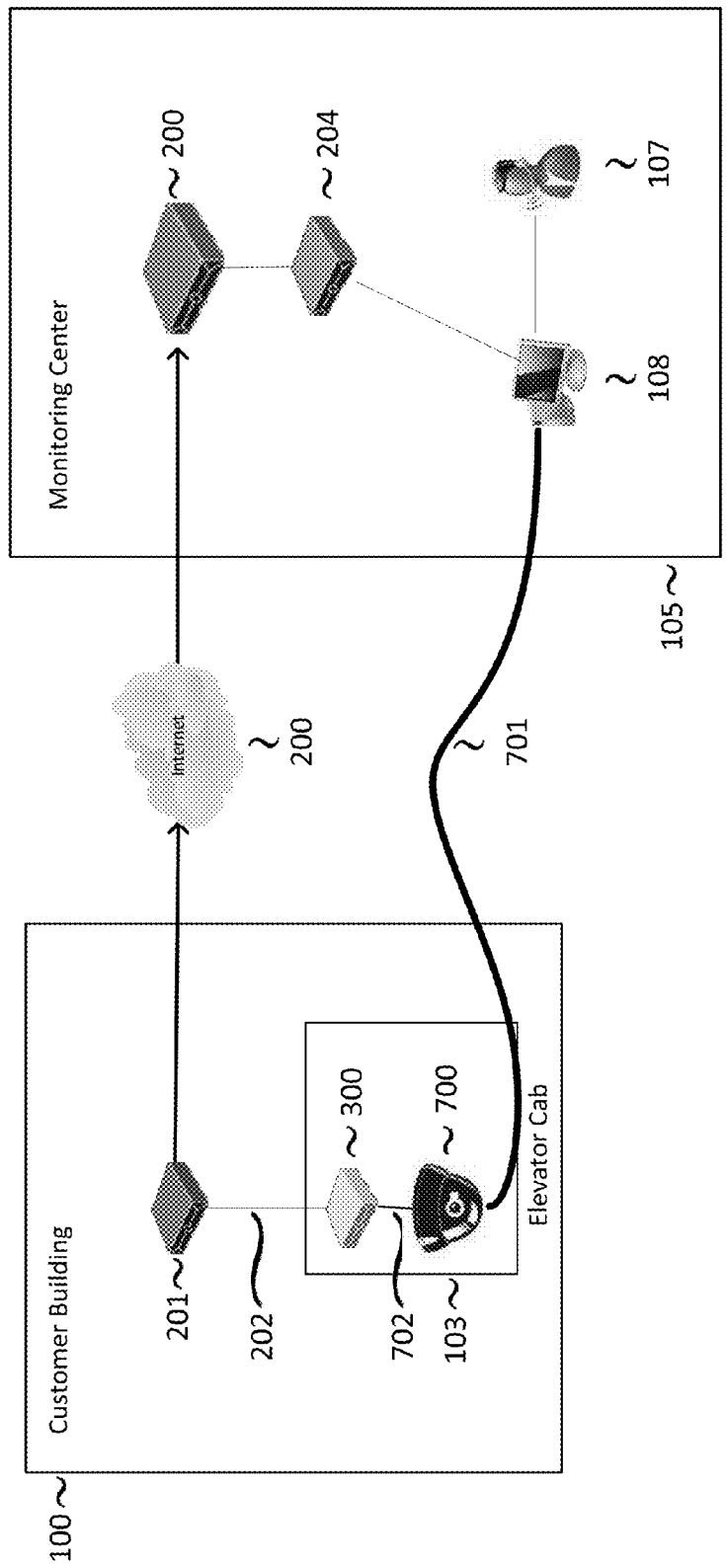

EMERGENCY COMMUNICATION SOLUTION

CROSS-REFERENCE TO RELATED APPLICATIONS

This application claims the benefit of and priority to U.S. Provisional Patent Application No. 61/833,283, filed on Jun. 10, 2013, which is incorporated herein by reference in its respective entirety.

FIELD OF THE INVENTION

The present disclosure relates to the Emergency Communication Solution (ECS) which provides a monitored and stable communication path between an emergency phone location and a monitoring center operator.

BACKGROUND

Referring to FIG. 1, current Technical Standards and Safety Authority (TSSA) codes require multiple story buildings 100 to have a dedicated phone line 104 installed for communication from the elevator cab(s) 103 in case of emergency. The elevator cab must be equipped with an auto dialer unit 101 and elevator cab phone 102 to establish the call on the phone line 104.

The cost for the phone lines can be anywhere from 40 to 65 dollars per month. However the phone lines 104 are not actively monitored and can be accidentally disconnected without notice. The phone lines 104 must be tested on a monthly basis to insure the auto dialer 101 functionality is still working With the current technology, the monitoring center operators 107 rely solely on caller ID from the PBX 106 to identify the caller's location and account information. When an incoming emergency call is received, the operator 107 must enter the caller ID information (if available) into their automation system workstation 108 in order to retrieve the account information and more importantly the building address. In some instances newer installations would have a playback device installed that will allow the operator in the monitoring center to press a digit to hear a pre-recorded message (detailing the sites information). Approximately 90 percent of existing elevator installations are active with traditional Auto Dialer 101 technology—no recorded message functionality. This call flow topology is very inefficient and is susceptible to human error when troubleshooting where the call is actually being generated.

What is needed is an emergency communication solution that is more efficient and less susceptible to human error than current solutions in the art. What is also needed is an emergency communication solution that improves the communication between the operator and the caller.

SUMMARY

In accordance with one embodiment, a communication system for emergency communication comprises a communication server to establish an IP based voice communication between an endpoint and a monitoring center. In one implementation, the system establishes an emergency call using an emergency communication system comprising a communication endpoint, a communication interface and a monitoring center comprising an automation system and a communication server to establish an IP based voice communication. The system initiates the emergency call at the endpoint location using the communication interface, establishes an IP based voice communication between the endpoint and the monitoring center via the communication server, and automatically sends a message from the communication server to the automation system when the call is initiated.

A preferred Emergency Communication Solution (ECS) includes two components which together will establish a monitored IP connection that provides i) a two-way speech path between an operator and an emergency user, ii) detailed site information to the operator by integrating with the existing automation system, and iii) optional video conferencing capabilities between the operator and the emergency user.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 1 is a topology diagram of the existing topology used to meet the current TSSA codes.

FIG. 2 is a diagram of the Emergency Communication Solution functional topology.

FIG. 3 is a diagram of the Emergency Communication Solution Endpoint ECSE 300 components.

FIG. 4 is a diagram of the Emergency Communication Solution Server ECSS 200 components.

FIG. 5 is a diagram of the Emergency Communication Solution and call flow diagram.

FIG. 6 is a diagram of the monitored IP connection between the ECSS and ECSE.

FIG. 7 is a diagram of the optional video functionality that can be incorporated into the Emergency Communication Solution.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

The Emergency Communication Solution (ECS) consists of two key components that work together to provide an actively monitored communication path between emergency phone and a monitoring center in a location remote from the emergency phone.

Referring to FIG. 2, when the phone 102 is taken off hook by the distressed party inside the elevator cab 103, dial tone and auto dial functionality (auto dialer 201) is initiated by the Emergency Communication Solution Endpoint (ECSE) unit 300. The telephone 102 is connected to the ECSE unit 300 by telephone cable 203 and the autodialer 201 is connected to the ECSE unit by telephone cable 202. It should be noted by a person ordinarily skilled in the art that different means to connect the various devices at the user location, including Cat5 cables and fiber optic cables are possible and are included within the scope of the claims of the present invention. The ECSE sends an IP packet request to the Emergency Communication Solution Server (ECSS) 400 to initiate a Voice over Internet Protocol (VOIP) communication between the caller and an emergency monitoring center 105 which is located elsewhere.

Once the ECSS 400 device located in the Monitoring Center 105, detects the incoming IP packet request from the ECSE 300 device, two tasks are started in parallel:

The ECSS 400 connects the 2-way (VoIP) audio from the elevator cab phone 102 (received via the internet through ECSE device 300) to the monitoring center systems PBX 106 unit. The physical connection between the ECSS 400 analog trunk module connection port 404 shown in FIG. 4, and the PBX 106 is established using a 2 conductor voice cable 205. Another 2 conductor voice cable 205 connects the ECSS device 400 and the monitoring center automation system 204. Once the PBX 106 receives the incoming call, the call is routed to the operator's 107 phone. Using the ECSS 400 and ECSE 300 devices to establish this call using VoIP eliminates the need for a carrier provided analog phone line, therefore eliminating the monthly costs associated with such a line.

When the ECSS device 400 detects the incoming IP Packet from the ECSE 300 device it generates a message that is relayed through the analog trunk module connection 405 shown in FIG. 4, to the monitoring center automation system 204. The automation system 204 then delivers the account information including the callers location, to the operator's workstation 108.

Referring to FIG. 3, the first component is the Emergency Communication Solution Endpoint (ECSE) 300, which is installed at the location where Emergency Communication is required (e.g. in an elevator cab 103).

In a preferred embodiment, the ECSE device 300 contains the following components:
Local IP based Administrator Port 301
LAN connection for internet connectivity 302
Power connection (plug or hard wire capability) 303
Backup phone analog port 304
Emergency phone analog port 305
Power indicator 306
System status indicator 307
Call status indicator 308
Terminal strip 309—All analog and power connections 303, 304 and 305 can be connected using connectors or hard wired method (via terminal strip 309)

Some of the features or components are optional, except for the LAN connectivity 302 and power connection 303.

Referring to FIG. 4, the second component is the Emergency Communication Solution Server ECSS 400, which is installed in the monitoring center 105 datacenter.

In a preferred embodiment, the ECSS 400 unit contains the following key components installed inside a standard server chassis:

1. LAN Connection 401.
2. Linux based operating system 402.
3. ECS proprietary software module 403.
4. Analog trunk module connection to monitoring center telephone system 404.
5. Analog trunk module connection to monitoring center automation system 405.

FIG. 5 describes the call flow for an ECS emergency call described in FIG. 2. When a call is initiated 501 using the phone 102, the call is routed via an internet connection using VoIP 200 by the ECSE 201. The ECSS 400 receives the call 502, determines the caller ID, accesses the database to find the corresponding client information, and generates a message 503 which is sent to the automation system 405. The message contains account information and location information including the building address where the call originated. The automation system 204 processes the incoming message 505 and the detailed caller account information and building address is displayed 506 on the workstation 108. The ECSS also bridges the audio 504 to the PBX 106 and an audio connection is established 507 with the operator 107 enabling 2 way audio communication between the operator and the caller.

Referring to FIG. 6, in another preferred embodiment, additional functionality provided by the Emergency Communication Solution technology includes a monitored heartbeat 600 to monitor the status and readiness of the system. If the ECSE's 300 IP connection goes offline for a period of time, the ECSS 400 device is programmed to generate a communication failure message after a predetermined time period that the device is offline, has passed. The failure message is relayed through the Analog Trunk Module connection 405 to the monitoring center's automation system 204. The automation system then delivers the outage notification to the operator's workstation 108. The operator 107 can then notify the customer of the network issues being seen at the customer site so that the customer can correct any problems with their equipment.

In another preferred embodiment shown in FIG. 7, the Emergency Communication Solution technology can also establish 2-way video communications between the operator and the caller. Instead of audio being bridged through the ECSS 400 device, a video call 701 is established directly between the elevator cab camera 700 and the operator at the monitoring center. The elevator cab camera 700 is connected to the ESCE 300 device using a CAT5 cable 702. It should be noted by a person ordinarily skilled in the art that other types of cable can be used to achieve a video connection without departing from the scope of the invention. While the video call is in progress, the ECSS 400 device continues to generate the message that is relayed through the Analog Trunk Module connection to Monitoring Center Automation System 204 (message contains the site information).

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:
1. A method comprising:
providing a computer server coupled to a communications network supporting Internet Protocol (IP) based communications;

providing a plurality of remote devices, each remote device associated with a predetermined element of infrastructure, connected to the communications network and supporting IP based communications;

determining connectivity of the plurality of remote devices to the communications network via "heart beat" IP messages;

determining an event associated with a remote device of the plurality of remote devices;

determining at the computer server an action in dependence upon the determined connectivity or the determination of an event; and performing the action, wherein the action comprises:

a first alarm sequence when the determination is respect to connectivity; and a second alarm sequence when the determination is with respect to an event.

2. The method according to claim 1, wherein the first alarm sequence comprises:

establishing an identity associated with the remote device triggering the action from a first database lookup;

establishing contact data relating to the element of infrastructure associate with the remote device identity from a second database lookup; and sending a notification using the contact data of a connectivity issue relating to the element of infrastructure.

3. The method according to claim 1, wherein the first alarm sequence comprises:

establishing an identity associated with the remote device triggering the action from a first database lookup;

establishing data relating to the element of infrastructure associated with the remote device identity from a second database lookup;

establishing contact data relating to the identified element of infrastructure; and sending a notification to a computer system for processing and display to an operator of the computer system, the notification comprising the data and contact data.

4. The method according to claim 1, wherein the second alarm sequence comprises:

establishing an identity associated with the remote device triggering the action from a first database lookup;

establishing data relating to the element of infrastructure associated with the remote device identity from a second database lookup;

establishing contact data relating to the identified element of infrastructure;

sending a notification to a computer system for processing and display to an operator of the computer system, the notification comprising the data and contact data; and connecting the operator to the remote device to allow bidirectional audio communications.

5. The method according to claim 1, wherein the second alarm sequence comprises:

establishing an identity associated with the remote device triggering the action from a first database lookup;

establishing data relating to the element of infrastructure associated with the remote device identity from a second database lookup;

establishing contact data relating to the identified element of infrastructure;

sending a notification to a computer system for processing and display to an operator of the computer system, the notification comprising the data and contact data;

connecting the operator to the remote device to allow bidirectional audio communications; and displaying to the operator visual information obtained from a camera associated with the predetermined element of infrastructure.

6. The method according to claim 1, wherein the remote device comprises a communications interface and an emergency system endpoint device; and the remote device is installed as part of the predetermined element of infrastructure.

7. The method according to claim 1, wherein the second alarm sequence comprises enabling a camera associated with the predetermined element of infrastructure.

8. A system comprising:

a computer server coupled to a communications network supporting Internet Protocol (IP) based communications;

a plurality of remote devices, each remote device associated with a predetermined element of infrastructure, connected to the communications network and supporting IP based communications; and a non-volatile non-transitory storage medium comprising instructions executable by a microprocessor forming part of the computer server, the instructions when executed relating to a process comprising:

determining connectivity of the plurality of remote devices to the communications network via "heart beat" IP messages;

determining an event associated with a remote device of the plurality of remote devices;

determining at the computer server an action in dependence upon the determined connectivity or the determination of an event; and performing the action, wherein the action comprises:

a first alarm sequence when the determination is respect to connectivity; and a second alarm sequence when the determination is with respect to an event.

9. The system according to claim 8, wherein the first alarm sequence comprises:

establishing an identity associated with the remote device triggering the action from a first database lookup;

establishing contact data relating to the element of infrastructure associate with the remote device identity from a second database lookup; and sending a notification using the contact data of a connectivity issue relating to the element of infrastructure.

10. The system according to claim 8, wherein the first alarm sequence comprises:

establishing an identity associated with the remote device triggering the action from a first database lookup;

establishing data relating to the element of infrastructure associated with the remote device identity from a second database lookup;

establishing contact data relating to the identified element of infrastructure; and sending a notification to a computer system for processing and display to an operator of the computer system, the notification comprising the data and contact data.

11. The system according to claim 8, wherein the second alarm sequence comprises:

establishing an identity associated with the remote device triggering the action from a first database lookup;

establishing data relating to the element of infrastructure associated with the remote device identity from a second database lookup;

establishing contact data relating to the identified element of infrastructure;

sending a notification to a computer system for processing and display to an operator of the computer system, the notification comprising the data and contact data; and connecting the operator to the remote device to allow bidirectional audio communications.

12. The system according to claim 8, wherein the second alarm sequence comprises:

establishing an identity associated with the remote device triggering the action from a first database lookup;

establishing data relating to the element of infrastructure associated with the remote device identity from a second database lookup;

establishing contact data relating to the identified element of infrastructure;

sending a notification to a computer system for processing and display to an operator of the computer system, the notification comprising the data and contact data;

connecting the operator to the remote device to allow bidirectional audio communications; and displaying to the operator visual information obtained from a camera associated with the predetermined element of infrastructure.

13. The system according to claim 8, wherein the remote device comprises a communications interface and an emergency system endpoint device; and the remote device is installed as part of the predetermined element of infrastructure.

14. The system according to claim 8, wherein the second alarm sequence comprises enabling a camera associated with the predetermined element of infrastructure.

* * * * *